H. F. NEUMEYER.
SPRAYER FOR PLANTS.
APPLICATION FILED JAN. 18, 1919.
1,348,038.
Patented July 27, 1920.
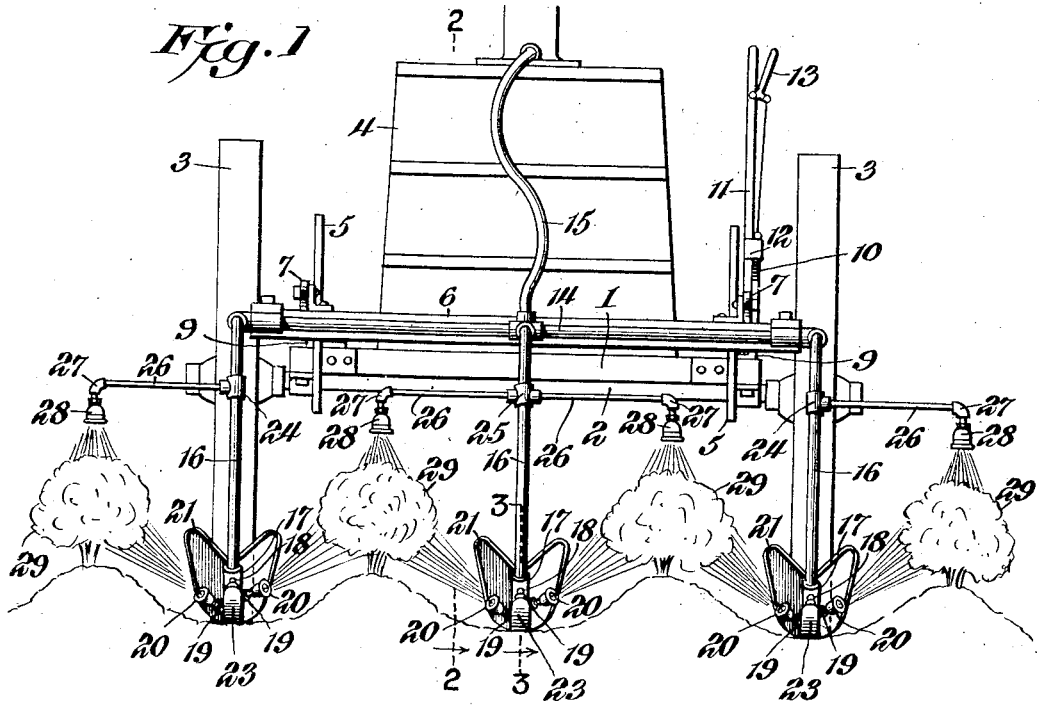
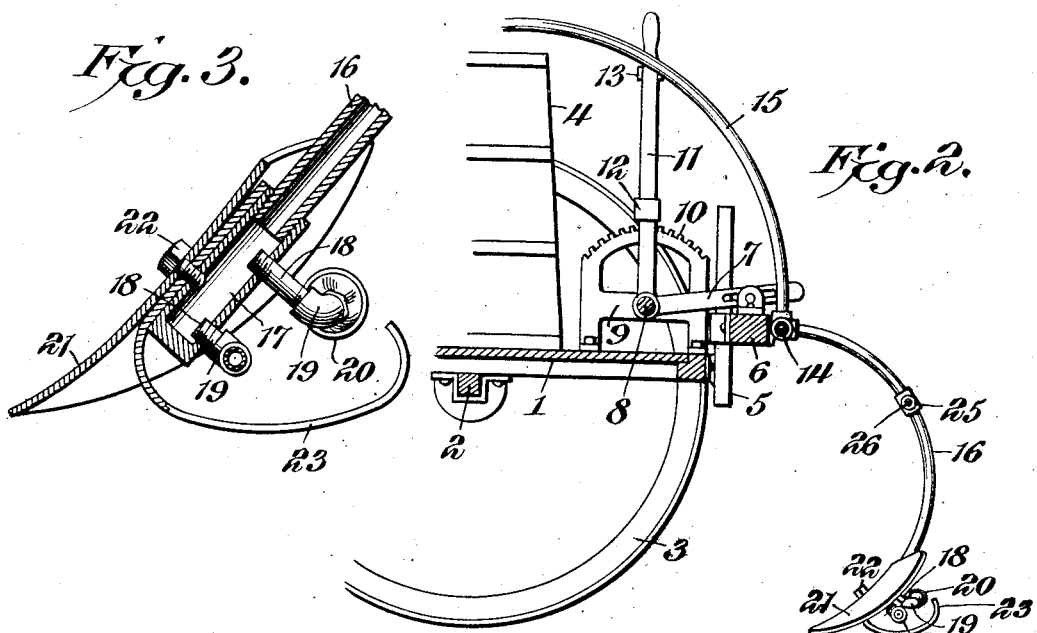
WITNESSES
Howard D. Orr.
F. T. Chapman.
H. F. Neumeyer, INVENTOR,
BY E. G. Siggers
ATTORNEY

UNITED STATES PATENT OFFICE.

HORACE FALK NEUMEYER, OF MACUNGIE, PENNSYLVANIA.

SPRAYER FOR PLANTS.

1,348,038.  Specification of Letters Patent.  Patented July 27, 1920.

Application filed January 18, 1919. Serial No. 271,822.

*To all whom it may concern:*

Be it known that I, HORACE F. NEUMEYER, a citizen of the United States, residing at Macungie, in the county of Lehigh and State of Pennsylvania, have invented a new and useful Sprayer for Plants, of which the following is a specification.

This invention has reference to sprayers for plants, and its object is to provide a spraying apparatus particularly adapted for spraying potato vines, although useful for spraying other vines or plants.

In accordance with the invention a supply of spraying liquid is carried by a vehicle and also carried by the vehicle are lifting devices for raising fallen vines either trodden down by draft animals drawing the vehicle, or from other causes. The fallen vines are thereby lifted and aerated, thus preventing them from rotting. At the same time the liquid is sprayed onto the vines from below upwardly, and provision is made for directing the spraying liquid downwardly on top of the vines, thereby very thoroughly spraying the vines.

The invention will be best understood from a consideration of the following detailed description taken in connection with the accompanying drawing forming part of this specification, with the understanding, however, that the invention is not confined to any strict conformity with the showing of the drawing but may be changed and modified so long as such changes and modifications mark no material departure from the salient features of the invention as expressed in the appended claims.

Figure 1 is a rear elevation of a sprayer constructed in accordance with the invention.

Fig. 2 is a section on the line 2—2 of Fig. 1, but showing the tank for the spraying material in elevation.

Fig. 3 is a section on the line 3—3 of Fig. 1, with some parts in elevation and on a larger scale than that of Fig. 1.

Referring to the drawing, there is shown a body portion 1, axle 2 and wheels 3 of a vehicle, the body portion 1 carrying a tank 4 for spraying liquid. While not so shown the tank 4 may be considered as provided with means for establishing pressure therewithin to drive the spraying liquid contained in the tank therefrom.

The body member 1 is provided with guides 5 for a beam 6 so that the latter may slide up and down on the guides. The beam is carried near its ends by arms 7 radiating from and fast to a rock shaft 8 having suitable journal bearings 9. One of the journal bearings for the rock shaft 8 is formed with a rack segment 10 and fast to the shaft 8 is a hand lever 11 associated with the rack segment so that the beam 6 may be moved up or down and held in adjusted positions. A latch pawl 12 and thumb lever 13 on the lever 11 is provided for the purpose and may follow the usual practice in such structure.

Fast to the beam 6 is a pipe 14 having at one point, say about the mid-point, a flexible pipe connection 15 with the tank 4. At appropriate points along the pipe 14 are branch pipes 16 curved lengthwise similarly to the plow standards of cultivators. Each branch pipe 16 terminates at the lower end in an elongated hollow cap 17, best shown in Fig. 3. Connected to the cap 17 and communicating with the interior thereof are nipples 18 and elbows 19 with each elbow carrying a spraying nozzle 20, the nipples and elbows permitting the turning of the nozzles in different directions, these nozzles being usually directed upwardly, in practice, at an angle and toward respectively opposite sides of the elongated cap or chamber 17, so that the under sides of two rows of plants are sprayed by each pair of nozzles 20.

Fast to the cap or chamber 17 is a lifting member 21 which may be similar to a cultivator share and this lifting member 21 is secured to the cap or chamber 17 by a screw 22 with a rearwardly curved supporting shoe 23 interposed between the share and chamber and held by the screw 22.

Each branch pipe 16 includes a suitable fitting 24 or 25 as the case may be, and from these fittings extend other branch pipes 26 terminating in elbows 27 and spraying nozzles 28, which nozzles are located higher than the plants 29 to be sprayed, so that the nozzles 28 may be directed downwardly toward the tops of the plants with the nozzles 20 directed upwardly at an angle. Moreover, the nozzles 20 may point in a rearward direction as well as an upward one.

When the machine is in operation the wheels 3 travel in the valleys between hills of vines and the shares or lifting devices 21 also travel in the valleys. The shoes 23, which may be taken as indicative of any suitable supporting means for the purpose, are designed to travel on the ground and maintain the points of the shares 21 either on or slightly above the surface of the ground and in position to engage under fallen or trampled portions of the vines. These fallen portions of the vines are thereby lifted by the shares 21 so that the vines are aerated and prevented from rotting and are further lifted high enough to permit directing the spray from the nozzles 20 underneath the vines and upwardly through the vines. At the same time the sprays issuing from the nozzles 28 are directed downwardly onto the tops of the vines. In this manner the sprayer will act upon several rows of vines at a time depending upon the number of shares and sprayers employed and in going over a field with the spraying machine the vines are sprayed from above downwardly and from below upwardly with the spray reaching all parts of each vine, wherefore the spraying is particularly thorough and correspondingly efficient.

The spraying heads may be lifted or lowered and be variously adjusted to accommodate the sprayer to different field conditions. Furthermore, by means of the hand lever 11 the vine lifting shares or plates may be elevated sufficiently to permit transportation of the machine from place to place or may be lowered until the shoes 23 or other devices for the purpose will engage the ground and thus support the lifting plates so that they will not dig into the ground but will underride fallen vines and lift them to an appropriate height.

While the plant lifting member or share 21 may be of any suitable form it may be successfully used in the form shown in the drawings, that is, there is provided a distributing head and a lifting device carried thereby and comprising divergent wings slanting upwardly from the front toward the rear end of the plant lifting member. The distributing head is arranged to the rear of the wings about intermediate of the width thereof.

What is claimed is:—

1. A sprayer comprising a suitable vehicle, shares constituting lifting devices for fallen or depressed parts of the plants, means located in rear of said shares and adapted to travel on the ground to maintain the points of the shares either on or slightly above the surface of the ground, and spraying nozzles carried by the shares in rear thereof and tilted toward opposite sides thereof at a rising angle for directing sprays upwardly against the under sides of the plants.

2. In a spraying device, a plant lifting member comprising divergent wings slanting upwardly from the front toward the rear end, a distributing head carrying the wings and located to the rear thereof, and divergent spraying nozzles carried by the distributing head and tilted upwardly for directing spraying material back of and from beneath the lifting member.

3. In a spraying device, a plant lifting member comprising divergent wings slanting upwardly from the front toward the rear end, a distributing head carrying the wings and arranged rearward thereof, a ground-engaging member for the wings, and spraying nozzles carried by the distributing head for directing spraying material back of and from beneath the lifting member.

4. In a spraying device, a plant lifting member comprising a plate-like structure with divergent wings slanting upwardly from the front toward the rear, a ground-engaging device fast to the plate-like member and to the rear thereof for preventing the forward end of the plate-like member from entering the ground, a distributing head to the rear of and to which the plate-like lifting member is secured, spraying nozzles carried by the distributing head, and a supporting stem in the form of a pipe carrying the distributing head.

5. A spraying machine comprising a suitable vehicle, a cross bar mounted on the vehicle to move up and down, adjusting means carrying the cross bar for effecting the up and down movements thereof, a pipe carried by the cross bar, branch pipes leading therefrom and constituting supporting members, lifting means for plants carried by the ends of the branch pipes remote from the first-named pipe, with the second-named pipes each terminating behind the lifting means in the distributing head, ground-engaging means carried by each distributing head, and spraying nozzles carried by each distributing head.

6. A spraying machine comprising a suitable vehicle, a cross bar mounted on the vehicle to move up and down, adjusting means carrying the cross bar for effecting the up and down movements thereof, a pipe carried by the cross bar, branch pipes leading therefrom and constituting supporting members, lifting means for plants carried by the ends of the branch pipes remote from the first-named pipe, with the second-named pipes each terminating behind the lifting means in a distributing head, ground-engaging means carried by each distributing head, and spraying nozzles carried by each distributing head, each branch pipe being provided with another branch pipe leading therefrom at a higher point than the plants to be sprayed and each of the second-named branch pipes terminating in a spraying nozzle for directing spraying material downwardly against the plants.

In testimony that I claim the foregoing as my own I have hereto affixed my signature.

HORACE FALK NEUMEYER.

Witnesses:
DAVID J. NAGLE,
EDNA V. HEILMAN.